(12) United States Patent
Dabbiru et al.

(10) Patent No.: US 10,037,549 B2
(45) Date of Patent: Jul. 31, 2018

(54) METHODS AND SYSTEMS FOR DETECTING HOME AND EMPLOYMENT CHANGE CONVERSIONS

(71) Applicant: Google Inc., Mountain View, CA (US)

(72) Inventors: Lakshmi Kumar Dabbiru, Sunnyvale, CA (US); Senthil Kumar Hariramasamy, Los Altos, CA (US)

(73) Assignee: Google LLC, Mountain View, CA (US)

( * ) Notice: Subject to any disclaimer, the term of this patent is extended or adjusted under 35 U.S.C. 154(b) by 7 days.

(21) Appl. No.: 14/701,119

(22) Filed: Apr. 30, 2015

(65) Prior Publication Data

US 2016/0321693 A1    Nov. 3, 2016

(51) Int. Cl.
*G06Q 30/00* (2012.01)
*G06Q 30/02* (2012.01)
*G06Q 50/16* (2012.01)

(52) U.S. Cl.
CPC ......... *G06Q 30/0256* (2013.01); *G06Q 50/16* (2013.01)

(58) Field of Classification Search
None
See application file for complete search history.

(56) References Cited

U.S. PATENT DOCUMENTS

2012/0059708 A1* 3/2012 Galas ................. G06Q 30/0244
705/14.43
2013/0211963 A1* 8/2013 Williams ............... G06Q 30/04
705/26.43

FOREIGN PATENT DOCUMENTS

JP     2005044186 A  *  2/2005  ............. G06F 17/60

OTHER PUBLICATIONS

Mustafayev, Vasif. Difference between Oracle Date, Timestamp, Timestamp With Time Zone, Timestamp With Local Time Zone. (Tuesday, Jun. 5, 2012). Retrieved online Feb. 28, 2018. http://vmustafayev4en.blogspot.com/2012/06/difference-between-oracle-date.html.*

* cited by examiner

*Primary Examiner* — James A Reagan
(74) *Attorney, Agent, or Firm* — Foley & Lardner LLP

(57) ABSTRACT

Systems and methods for providing conversion metrics for ads related to the housing industry or the employment industry are provided. A system can identify a plurality of ads provided for display to a plurality of identifiers. Each of the plurality of ads is related to one of a housing industry or an employment industry. The system can identify, for an advertiser providing a subset of the identified plurality of ads, one or more identifiers to which the subset of the identified plurality of ads are provided for display. The system can determine, from a location database that includes location information of the plurality of identifiers, a number of identifiers of the identifiers to which the subset of the identified plurality of ads are provided for display that changed locations. The system can then provide, to the advertiser, a conversion metric based on the number of identifiers that changed locations responsive to determining that the number of identifiers is greater than a predetermined threshold.

18 Claims, 7 Drawing Sheets

| Time stamp | Content ID | Advertiser ID | Account ID | Query/Keyword | Action Type |
|---|---|---|---|---|---|
| 12:01 1-2-14 | 122home | QWE789 | 6358 | Best homes | Click |
| 03:54 1-3-14 | 312house | QWE789 | 1209 | HOUSE 3 | No Action |
| 09:43 1-3-14 | 421house | RET543 | 0398 | HOUSE 4 | No Action |
| 07:13 1-4-14 | 15house | RET543 | 4811 | New house | No Action |
| 09:21 1-4-14 | 122home | QWE789 | 6855 | HOUSE 6 | No Action |
| 02:31 1-5-14 | 12apt | NKE675 | 2581 | New apartment | Click |
| 08:31 1-6-14 | 122home | SSK230 | 7524 | HOUSE 5 | Click |
| 06:31 1-7-14 | 42lease | SSK230 | 0313 | Apt openings | No Action |
| 1:56 1-8-14 | 87condo | QWE789 | 0812 | Best condos | Click |
| 12:13 1-9-14 | 71mover | NKE675 | 7012 | Moving houses | No Action |

| Account ID | Home Location | Work Location | |
|---|---|---|---|
| 6358 | W5X67V | BAS234X | 450a |
| 1209 | AB432W | 12KSDS | 450b |
| 0398 | ASADC3 | 53VDDS | 450c |
| 0812 | 232SCV | 76BFDZ | 450d |
| 6855 | 2323SC | 87BVDS | 450e |
| 2581 | 6723C4 | 32XVDF | 450f |
| 7524 | 08MBJH | 32SNGF | 450g |
| 2358 | 67HFGF | 88GFGF | 450h |
| 0812 | 00GHHG | 90FFBS | 450i |
| 7012 | 62HGDX | 70OIYY | 450j |

| Account ID | Home Location | Work Location | |
|---|---|---|---|
| 6358 | 22GFSS | BAS234X | 450a |
| 1209 | AB432W | 12KSDS | 450b |
| 0398 | 22WEED | 53VDDS | 450c |
| 0812 | 232SCV | 12WWER | 450d |
| 6855 | 2323SC | 87BVDS | 450e |
| 2581 | 6723C4 | 90FSSR | 450f |
| 7524 | 08MBJH | 32SNGF | 450g |
| 2358 | 67HFGF | 55BRRE | 450h |
| 0812 | 00GHHG | 90FFBS | 450i |
| 7012 | 54222W | 70OIYY | 450j |

METHODS AND SYSTEMS FOR DETECTING HOME AND EMPLOYMENT CHANGE CONVERSIONS

BACKGROUND

In a computer networked environment such as the internet, third-party content providers provide third-party content items for display on end-user computing devices. These third-party content items, for example, advertisements, can be linked to web pages associated with the third-party content providers. These third-party content items can include content identifying the third-party content provider that provided the content item.

SUMMARY

The present disclosure relates generally to methods and systems for providing conversion metrics for ads related to the housing industry or the employment industry. At least one aspect is directed to a method for providing conversion metrics for ads related to the housing industry or the employment industry. A data processing system including one or more processors can identify a plurality of ads provided for display to a plurality of identifiers. Each of the plurality of ads is related to one of a housing industry or an employment industry. The data processing system can identify, for an advertiser providing a subset of the identified plurality of ads, one or more identifiers to which the subset of the identified plurality of ads are provided for display. The data processing system can determine, from a location database that includes location information of the plurality of identifiers, a number of identifiers of the one or more identifiers to which the subset of the identified plurality of ads are provided for display that changed locations. The data processing system can then provide, to the advertiser, a conversion metric based on the number of identifiers that changed locations responsive to determining that the number of identifiers is greater than a predetermined threshold.

In some implementations, the data processing system can identify a plurality of search queries representative of one of the housing industry or the employment industry and provide, for display, in response to the search queries, the plurality of ads to the plurality of identifiers.

In some implementations, the data processing system can identify one or more information resources relating to the housing industry. The data processing system can then perform keyword clustering on the identified information resources. The data processing system can determine one or more keyword clusters that appear in each of the information resources relating to the housing industry. In some such implementations, the data processing system can identify the plurality of ads related to the housing industry by identifying ads that were selected for display based on a keyword included in the one or more keyword clusters that appear in each of the information resources relating to the housing industry.

In some implementations, the data processing system can identify one or more information resources relating to the employment industry. The data processing system can then perform keyword clustering on the identified information resources. The data processing system can determine one or more keyword clusters that appear in each of the information resources relating to the employment industry. In some such implementations, the data processing system can identify the plurality of ads related to the employment industry by identifying the plurality of ads related to the employment industry includes identifying ads that were selected for display based on a keyword included in the one or more keyword clusters that appear in each of the information resources relating to the employment industry.

In some implementations, determining, from the location database that includes location information of the plurality of identifiers, the number of identifiers of the one or more identifiers to which the subset of the identified plurality of ads are provided for display that changed locations, includes providing, to the location database, a request including the one or more identifiers to which the subset of the identified plurality of ads are provided for display and receiving a response to the request, the response identifying the number of identifiers of the one or more identifiers to which the subset of the identified plurality of ads are provided for display that changed locations.

In some implementations, the location database associates location information of the plurality of identifiers to a respective identifier of the plurality of identifiers. In some implementations, determining, from the location database that includes location information of the plurality of identifiers, the number of identifiers of the one or more identifiers to which the subset of the identified plurality of ads are provided for display that changed locations, further includes identifying, for each identifier of the one or more identifiers to which the subset of the identified plurality of ads are provided for display, via the location database, that a location of a home or employment of the identifier has changed.

In some implementations, identifying the plurality of ads related to advertisers advertising services for housing or employment changes includes identifying ads by parsing landing pages of ads and identifying keywords relating to housing or employment changes.

In some implementations, the data processing system can maintain a database including a plurality of entries. Each entry corresponds to an ad serving event and each entry includes i) an identifier field that identifies the identifier to which the ad is served, ii) a content identifier identifying the ad served to the identifier, iii) an action field identifying any action taken on the ad, and iv) a keyword field identifying one or more keywords according to which the ad was selected for display.

At least one aspect is directed to a system for providing conversion metrics for ads related to the housing industry or the employment industry. The system can include a data processing system having a content selection module, a content detection module, and a conversion metric determination module. The data processing system can identify a plurality of ads provided for display to a plurality of identifiers. Each of the plurality of ads is related to one of a housing industry or an employment industry. The data processing system can identify, for an advertiser providing a subset of the identified plurality of ads, one or more identifiers to which the subset of the identified plurality of ads are provided for display. The data processing system can determine, from a location database that includes location information of the plurality of identifiers, a number of identifiers of the one or more identifiers to which the subset of the identified plurality of ads are provided for display that changed locations. The data processing system can then provide, to the advertiser, a conversion metric based on the number of identifiers that changed locations responsive to determining that the number of identifiers is greater than a predetermined threshold.

In some implementations, the data processing system can identify a plurality of search queries representative of one of the housing industry or the employment industry and provide, for display, in response to the search queries, the plurality of ads to the plurality of identifiers.

In some implementations, the data processing system can identify one or more information resources relating to the housing industry. The data processing system can then perform keyword clustering on the identified information resources. The data processing system can determine one or more keyword clusters that appear in each of the information resources relating to the housing industry. In some such implementations, the data processing system can identify the plurality of ads related to the housing industry by identifying ads that were selected for display based on a keyword included in the one or more keyword clusters that appear in each of the information resources relating to the housing industry.

In some implementations, the data processing system can identify one or more information resources relating to the employment industry. The data processing system can then perform keyword clustering on the identified information resources. The data processing system can determine one or more keyword clusters that appear in each of the information resources relating to the employment industry. In some such implementations, the data processing system can identify the plurality of ads related to the employment industry by identifying the plurality of ads related to the employment industry includes identifying ads that were selected for display based on a keyword included in the one or more keyword clusters that appear in each of the information resources relating to the employment industry.

In some implementations, determining, from the location database that includes location information of the plurality of identifiers, the number of identifiers of the one or more identifiers to which the subset of the identified plurality of ads are provided for display that changed locations, includes providing, to the location database, a request including the one or more identifiers to which the subset of the identified plurality of ads are provided for display and receiving a response to the request, the response identifying the number of identifiers of the one or more identifiers to which the subset of the identified plurality of ads are provided for display that changed locations.

In some implementations, the location database associates location information of the plurality of identifiers to a respective identifier of the plurality of identifiers. In some implementations, determining, from the location database that includes location information of the plurality of identifiers, the number of identifiers of the one or more identifiers to which the subset of the identified plurality of ads are provided for display that changed locations, further includes identifying, for each identifier of the one or more identifiers to which the subset of the identified plurality of ads are provided for display, via the location database, that a location of a home or employment of the identifier has changed.

In some implementations, identifying the plurality of ads related to advertisers advertising services for housing or employment changes includes identifying ads by parsing landing pages of ads and identifying keywords relating to housing or employment changes.

In some implementations, the data processing system can maintain a database including a plurality of entries. Each entry corresponds to an ad serving event and each entry includes i) an identifier field that identifies the identifier to which the ad is served, ii) a content identifier identifying the ad served to the identifier, iii) an action field identifying any action taken on the ad, and iv) a keyword field identifying one or more keywords according to which the ad was selected for display.

At least one aspect is directed towards a computer-readable storage medium having computer-executable instructions stored thereon, which when executed by one or more processors, cause the one or more processors to perform operations comprising identifying a plurality of ads provided for display to a plurality of identifiers, each of the plurality of ads related to one of a housing industry or an employment industry, identifying, for an advertiser providing a subset of the identified plurality of ads, one or more identifiers to which the subset of the identified plurality of ads are provided for display, determining, from a location database that includes location information of the plurality of identifiers, a number of identifiers of the one or more identifiers to which the subset of the identified plurality of ads are provided for display that changed locations and providing, to the advertiser, a conversion metric based on the number of identifiers that changed locations responsive to determining that the number of identifiers is greater than a predetermined threshold.

In some implementations, the computer-readable storage medium further includes instructions, which cause the processor to identify a plurality of search queries representative of one of the housing industry or the employment industry and providw, for display, in response to the search queries, the plurality of ads to the plurality of identifiers.

In some implementations, the computer-readable storage medium further includes instructions, which cause the processor to identify one or more information resources relating to the housing industry, perform keyword clustering on the identified information resources, and determine one or more keyword clusters that appear in each of the information resources relating to the housing industry. In some implementations, identifying the plurality of ads related to the housing industry includes identifying ads that were selected for display based on a keyword included in the one or more keyword clusters that appear in each of the information resources relating to the housing industry.

In some implementations, the computer-readable storage medium further includes instructions, which cause the processor to identify one or more information resources relating to the employment industry, perform keyword clustering on the identified information resources, determine one or more keyword clusters that appear in each of the information resources relating to the employment industry and identify the plurality of ads related to the housing industry includes identifying ads that were selected for display based on a keyword included in the one or more keyword clusters that appear in each of the information resources relating to the employment industry.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 3B is a table including entries relating to advertisements provided for display at one or more computing devices based on queries or keywords related to the housing industry, according to an illustrative implementation.

FIG. 4A is a table including entries relating to identifiers and their associated home and employment addresses at a first time, according to an illustrative implementation;

FIG. 4B is a table including entries relating to identifiers and their associated home and employment addresses at a second time, according to an illustrative implementation;

DETAILED DESCRIPTION

Figure 1:
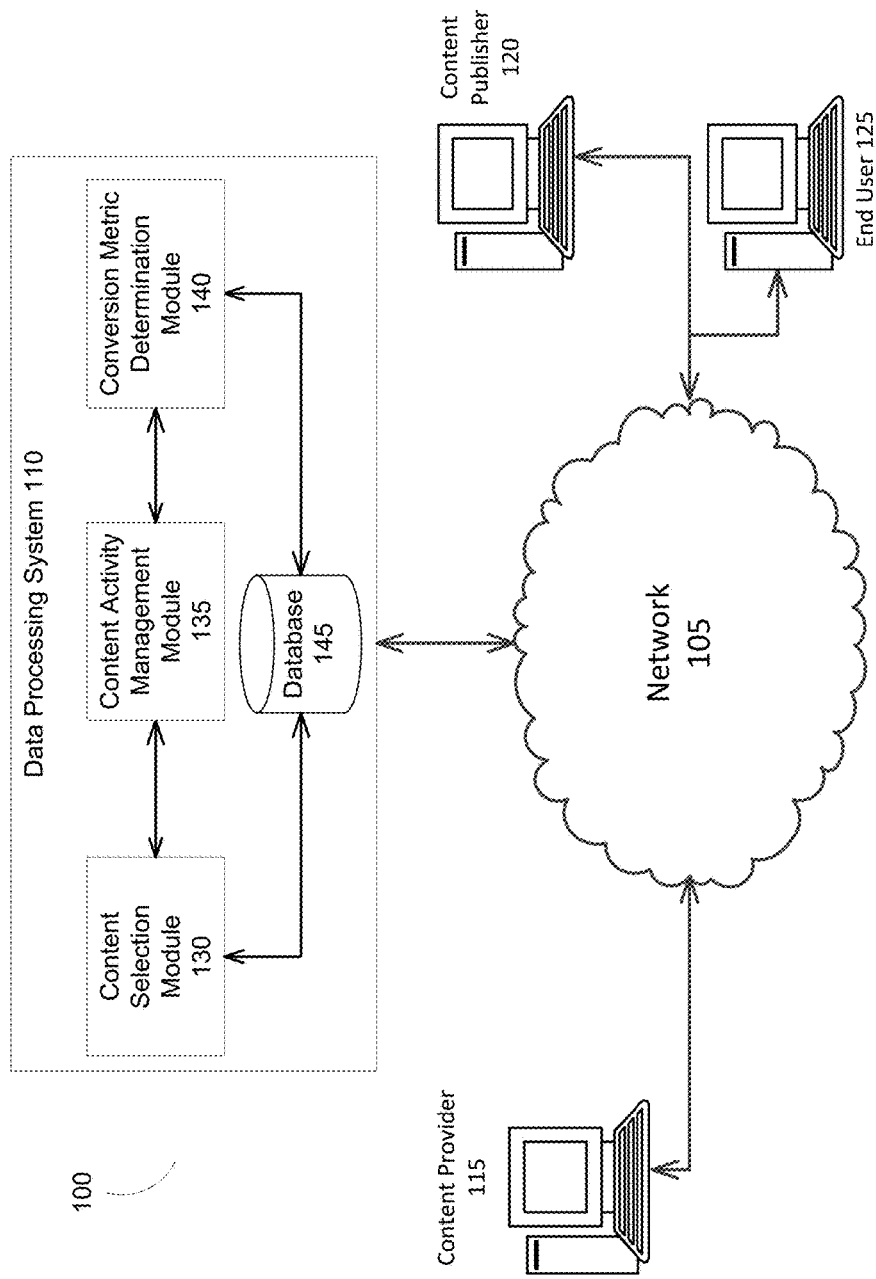
FIG. 1 is a block diagram depicting one implementation of an environment for providing conversion metrics for ads related to the housing industry or the employment industry in a computer network environment, according to an illustrative implementation.

Following below are more detailed descriptions of various concepts related to, and implementations of, methods, apparatuses, and systems of detecting housing or employment change conversions in a computer network environment. The various concepts introduced above and discussed in greater detail below may be implemented in any of numerous ways, as the described concepts are not limited to any particular manner of implementation.

Ad conversion is an important metric that online advertisers use for monitoring the performance of their advertisement campaigns. In some industry verticals, conversions are tracked by tracking online sales or other online transactions completed by users after interacting with ads. However, advertisers in some other industry verticals may be unable to track the performance of their ad campaigns via online sales or transactions. For example, advertisers in the housing or employment industry verticals cannot accurately monitor the performance of their advertising campaigns. Examples of advertisers that advertise in the housing industry include real estate agencies, apartment building management companies, and other entities that serve ads based on keywords related to the housing industry vertical. Examples of advertisers that advertise in the employment industry include recruiters, executive job placement service providers, large corporations, and other entities that serve ads based on keywords related to the employment industry vertical.

In general, when a user requests content, for example, by submitting a search query, the advertising system can select and provide an ad for display based on a relevance between the query and one or more keywords. Ads of advertisers bidding on keywords related to housing or jobs are likely to be provided to users submitting search queries relating to housing or job based on the relevance between the search queries and keywords. As such, the advertising system can store, in a database, a plurality of entries corresponding to each ad served to a computing device. Each entry can include information corresponding to an ad serving event. Each ad serving event is initiated upon the advertising system receiving a request for an ad. The request for an ad can include various items of information, including but not limited to a device identifier identifying the computing device from which the request originated, a user account identifier identifying a user associated with the computing device, and a timestamp identifying a time the request for content was either made or received.

According to some aspects, the data processing system can be configured to identify a plurality of ads provided for display to a plurality of identifiers, each of the plurality of ads related to one of a housing industry or an employment industry; identify, for an advertiser providing a subset of the identified plurality of ads, one or more identifiers to which the subset of the identified plurality of ads are provided for display; determine, from a location database that includes location information of the plurality of identifiers, a number of identifiers of the one or more identifiers to which the subset of the identified plurality of ads are provided for display that changed locations; and provide, to the advertiser, a conversion metric based on the number of identifiers that changed locations responsive to determining that the number of identifiers is greater than a predetermined threshold, among others.

FIG. 1 is a block diagram depicting one implementation of an environment for detecting housing or employment change conversions based on location information that is received with requests to provide content to communication devices in a computer network environment. The environment 100 includes at least one data processing system 110. The data processing system 110 can include at least one processor and a memory, i.e., a processing circuit. The memory stores processor-executable instructions that, when executed by processor, cause the processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language. The data processing system can include one or more computing devices or servers that can perform various functions. In some implementations, the data processing system can include an advertising auction system configured to host auctions. In some implementations, the data processing system does not include the advertising auction system but is configured to communicate with the advertising auction system via the network 105.

The network 105 can include computer networks such as the internet, local, wide, metro or other area networks, intranets, satellite networks, other computer networks such as voice or data mobile phone communication networks, and combinations thereof. The data processing system 110 of the system 100 can communicate via the network 105, for instance with at least one content provider computing device 115, at least one content publisher computing device 120, or at least one end user computing device 125. The network 105 may be any form of computer network that relays information between the user computing device 115, data processing system 110, and one or more content sources, for example, web servers, advertising servers, amongst others. For example, the network 105 may include the Internet and/or other types of data networks, such as a local area network (LAN), a wide area network (WAN), a cellular network, satellite network, or other types of data networks. The network 105 may also include any number of computing devices (e.g., computer, servers, routers, network switches, etc.) that are configured to receive and/or transmit data within network 105. The network 105 may further include any number of hardwired and/or wireless connections. For example, the user computing device 115 may communicate wirelessly (e.g., via WiFi, cellular, radio, etc.) with a transceiver that is hardwired (e.g., via a fiber optic cable, a CAT5 cable, etc.) to other computing devices in network 105.

The content provider computing devices 115 can include servers or other computing devices operated by a content provider entity to provide content items such as advertisements for display on information resources at the end user computing device 125. The content provided by the content provider computing device 115 can include third party content items or creatives (e.g., ads) for display on information resources, such as a website or web page that includes primary content, e.g. content provided by the content publisher computing device 120. The content items can also be displayed on a search results web page. For instance, the content provider computing device 115 can provide or be the source of ads or other content items for display in content slots of content web pages, such as a web page of a company where the primary content of the web page is provided by the company, or for display on a search results landing page provided by a search engine. The content items associated with the content provider computing device 115 can be displayed on information resources other than web pages, such as content displayed as part of the execution of an application on a smartphone or other end user computing device 125.

The content publisher computing devices 120 can include servers or other computing devices operated by a content publishing entity to provide primary content for display via the network 105. For instance, the content publisher computing device 120 can include a web page operator who provides primary content for display on the web page. The primary content can include content other than that provided by the content publisher computing device 120, and the web page can include content slots configured for the display of third party content items (e.g., ads) from the content provider computing devices 115. For instance, the content publisher computing device 120 can operate the website of a company and can provide content about that company for display on web pages of the website. The web pages can include content slots configured for the display of third party content items such as ads of the content provider computing device 115. In some implementations, the content publisher computing device 120 includes a search engine computing device (e.g. server) of a search engine operator that operates a search engine website. The primary content of search engine web pages (e.g., a results or landing web page) can include results of a search as well as third party content items displayed in content slots such as content items from the content provider computing device 115.

The end user computing devices 125 can include computing devices configured to communicate via the network 105 to display data such as the content provided by the content publisher computing device 120 (e.g., primary web page content or other information resources) and the content provided by the content provider computing device 115 (e.g., third party content items such as ads configured for display in a content slot of a web page). The end user computing device 125, the content provider computing device 115, and the content publisher computing device 120 can include desktop computers, laptop computers, tablet computers, smartphones, personal digital assistants, mobile devices, consumer computing devices, servers, clients, digital video recorders, a set-top box for a television, a video game console, or any other computing device configured to communicate via the network 105. The end user computing devices 125 can be communication devices through which an end user can submit requests to receive content. The requests can include requests to a search engine and the requests can include search queries. In some implementations, the requests can include a request to access a web page.

In some implementations, the end user computing devices 125 can include communication devices through which advertisers can create, manage, and access advertising campaign data. Advertisers can access ad campaign management information via the end user computing device 125. In some implementations, an advertiser can adjust, change, or create one or more ad campaigns as well as view metrics relating to the performance of the ad campaigns via the end user computing devices 125. Taking account of the ad campaign management data, the advertisers can adjust the currently running ad campaign or create a new ad campaign. For example, if the ad campaign management data indicate that certain keywords result in greater conversion rates than others, an advertiser can reduce or take of bids for those less successful keywords. In some implementations, the advertisers can be related to the housing industry or employment industry and, via the end user computing device 125, access and modify ad campaigns as well as view the performance of the ad campaigns. In some implementations, the advertisers can view conversion metrics of ads related to the housing industry or employment industry based on an analysis of location information of computing devices of users that moved from a first house or job to another house or job.

The content provider computing devices 115, the content publisher computing device 120 and the end user computing devices 125 can include a processor and a memory, i.e., a processing circuit. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language.

The content provider computing devices 115, the content publisher computing devices 120 and the end user computing devices 125 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the content provider computing devices 115, the content publisher computing device 120 and the end user computing devices 125 (e.g., a built-in display, microphone, etc.) or external to the housing of content provider computing devices 115, the content publisher computing device 120 and the end user computing devices 125 (e.g., a monitor connected to the user computing device 115, a speaker connected to the user computing device 115, etc.), according to various implementations. For example, the content provider computing devices 115, the content publisher computing device 120 and the end user computing devices 125 may include an electronic display, which visually displays web pages using webpage data received from one or more content sources and/or from the data processing system 110 via the network 105. In some implementations, a content placement campaign manager or third-party content provider, such as an advertiser, can communicate with the data processing system 110 via the content provider computing devices 115. In some implementations, the advertiser can communicate with the data processing system 110 via a user interface displayed on the user interface devices of the content provider computing devices 115.

The data processing system 110 can include at least one server. For instance, the data processing system 110 can include a plurality of servers located in at least one data center or server farm. In some implementations, the data processing system 110 includes a content placement system, e.g., an ad server or ad placement system. The data processing system 110 can include at least one content selection module 130, at least one content activity management module 135, at least one conversion metric determination module 140 and at least one database 145. The content selection module 130, the c module 135 and the conversion metric determination module 140 can each include at least one processing unit, server, virtual server, circuit, engine, agent, appliance, or other logic device such as programmable logic arrays configured to communicate with the database 145 and with other computing devices (e.g., the content provider computing device 115, the content publisher computing device 120, or the end user computing device 125) via the network 105.

The content selection module 130, the content activity management module 135 and the conversion metric determination module 140 can include or execute at least one computer program or at least one script. The content selection module 130, the content activity management module 135 and the conversion metric determination module 140 can be separate components, a single component, or part of the data processing system 110. The content selection module 130, the content activity management module 135 and the conversion metric determination module 140 can include combinations of software and hardware, such as one or more processors configured to execute one or more scripts to identify a plurality of ads provided for display to a plurality of identifiers, each of the plurality of ads related to one of a housing industry or an employment industry; identify, for an advertiser providing a subset of the identified plurality of ads, one or more identifiers to which the subset of the identified plurality of ads are provided for display; determine, from a location database that includes location information of the plurality of identifiers, a number of identifiers of the one or more identifiers to which the subset of the identified plurality of ads are provided for display that changed locations; and provide, to the advertiser, a conversion metric based on the number of identifiers that changed locations responsive to determining that the number of identifiers is greater than a predetermined threshold, for example.

The data processing system 110 can also include one or more content repositories or databases 145. The databases 145 can be local to the data processing system 110. In some implementations, the databases 145 can be remote to the data processing system 110 but can communicate with the data processing system 110 via the network 105. The databases 145 can store tables including a plurality of entries corresponding to content items served to one or more computing devices. In some implementations, the tables can include entries as illustratively depicted in FIGS. 3A, 3B, 4A, and 4B. Additional details of the contents of the databases 145 will be provided below.

The content selection module 130 can be configured to select content for display at a computing device, such as the end user computing device 125. The content selection module 130 can be configured to select one or more ads for display. The ads may be selected via an ad auction. The ad auction may be based in part of the content of the ad and the content of the information resource on which the selected ad will be provided for display.

In some implementations, the content selection module 130 may select an ad in response to receiving a request to provide content to the end user computing device 125. In some implementations, the request to provide content received by the content selection module 130 can be generated in response to receiving a request to provide search query results from the computing device 125. In some implementations, the request to provide content received by the content selection module 130 includes the search query for which the search query results are requested. In some implementations, the request to provide content can be based on a search query related to the housing or employment industries. In some implementations, the request to provide content received by the content selection module 130 can be generated in response to receiving a request to access a particular information resource, such as a website. In some implementations, the request to access a particular information resource can include a request to access a webpage related to the housing or employment industries.

When selecting an ad for display at the end user computing device 125, the content selection module 130 may first identify a subset of ads for display and then select one of the subset of ads based on an auction. The content selection module 130 may identify the subset of ads based on the search query associated with the request received by the content selection module 130, or in some implementations, based on the information resource to which the end user computing device requests access. In some implementations, the content selection module 130 can identify advertisers advertising services for housing or employment changes based on content included in webpages of the advertisers. For instance, the content selection module 130 can be configured to identify websites as advertisers advertising services for employment or housing changes.

The content selection module 130 can be configured to receive a predetermined list of advertisers. In some implementations, the content selection module 130 can be configured to identify ads of advertisers included in the predetermined list. The predetermined list can be generated based on content included in an advertiser's website, among others. For instance, the data processing system 110 can generate a list of advertisers for the housing industry responsive to determining that the webpages of the advertisers include a predetermined set of keywords related to the housing industry. The data processing system 110 can similarly generate a list of advertisers for the employment industry responsive to determining that the webpages of the advertisers include a predetermined set of keywords related to the employment industry. In some implementations, the content selection module 130 can identify the list of advertisers responsive to receiving, from one or more advertisers, a request to receive conversion metrics related to ads in the housing or employment industries. In some implementations, an advertiser can request to receive conversion metrics related to ads of the advertiser. For instance, an advertiser that advertises housing related services in which a conversion on an ad can be a user moving from a first place to a second place. In one example, the advertiser can be an apartment complex advertising apartments for rent in a new building.

In some implementations, the content selection module 130 can be configured to identify the plurality of ads related to advertisers advertising services for housing or employment changes. In some implementations, the content selection module 130 can identify the plurality of ads related to advertisers advertising services for housing or employment changes based on a predetermined set of keywords on which the advertisers advertising services for housing or employment changes bid. In some implementations, the content selection module 130 can identify the plurality of ads related to advertisers advertising services for housing or employment changes by parsing landing pages of ads and identifying keywords relating to housing or employment changes. For example, the content selection module 130 can retrieve the text of the content included in the landing page and apply a keyword extraction algorithm to determine whether the text is related to housing or employment changes based on the keywords extracted.

Figure 2:
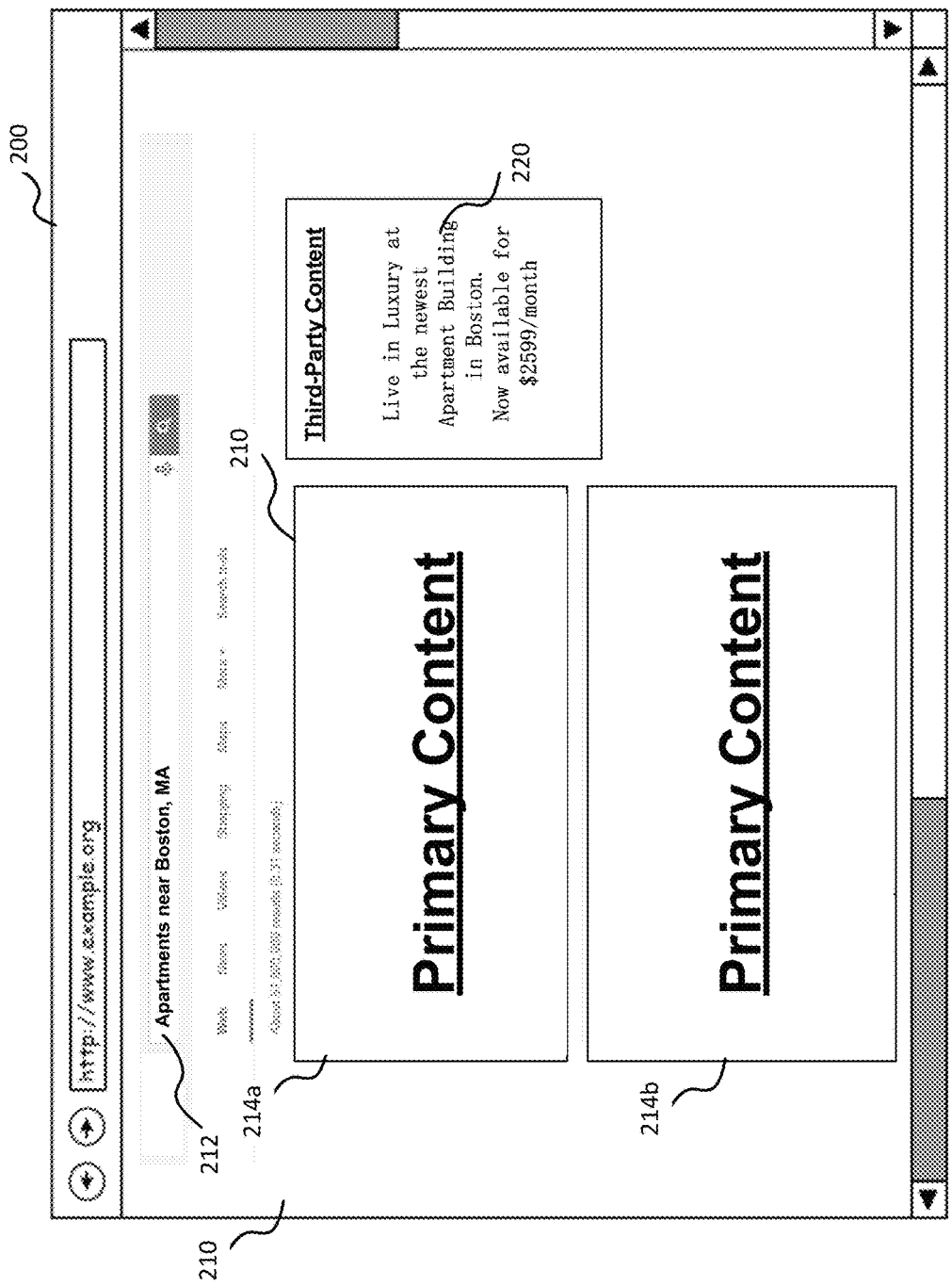
FIG. 2 is a display depicting an online search result document including a third-party content item related to the employment industry, according to an illustrative implementation.

Referring now also to FIG. 2, FIG. 2 is a display depicting an online search result document including a third-party content item related to the employment industry. The document 210, which may be an information resource, is displayed on a user interface 200 at an end user computing device, such as the end user computing device 125. The document 210 can include a search query 212 for which search results are generated and provided for display as primary content items 214a-214n on the document 210. The search query 212 can be received from a user of the computing device 125.

The document also displays a third-party content item, such as an advertisement 220 alongside the primary content items. The advertisement 220 can be selected by the content selection module 135 based on the search query 212. As shown in FIG. 2, the search query is 'Apartments near Boston, Mass.' is related to the housing industry and the advertisement 220 selected for display is related to the search query. In particular, the advertisement 220 is for an apartment in Boston. the advertiser advertising the advertisement 220 may have established an advertisement campaign to place bids on keywords or search queries related to Apartments in Boston. As shown in FIG. 2, the advertiser placed a winning bid on a keyword related to the search query "Apartments near Boston, Mass." such that the advertisement 220 was selected for display on the document 210.

A user of the computing device on which the document 210 is shown can take no action on the advertisement 220 or can take one or more actions. Examples of actions taken on the advertisement include clicking on the ad, hovering over the ad, tapping the ad, or taking some action indicative of a user responding to the advertisement 220. In some implementations, the user may take no action on the advertisement 220. In some implementations, the data processing system 110 can determine a length of time the advertisement is displayed on a display of the computing device of the user and determine that the advertisement 220 received a valid impression based on determining that the advertisement 220 was displayed for longer than a predetermined time period, for example, 2 seconds.

Referring again to FIG. 1, the content activity management module 135 can be configured to create, update and maintain a database, such as the database 145. The database can include one or more tables. A ad serving event table can include a plurality of entries corresponding to each ad provided for display to one or more computing devices 125. Each time an ad is served to an end user computing device, the content activity management module 135 can log the ad serving event by including an entry in the ad serving event table reflecting that an ad was provided for display. In some implementations, the content activity management module 135 can create an entry identifying one or more of a time at which the ad was provided for display, an identifier uniquely identifying the ad, the device identifier identifying the device on which the ad was provided for display, an account identifier identifying a user of the device, a keyword, query or keyword-query pair that caused the ad to be selected for display, and a performance indication indicating what, if any, action or actions were taken on the ad. In some implementations, the table can include a plurality of fields, including but not limited to a timestamp field, a content identifier field for identifying the content item provided for display, an account identifier field identifying a computing device or a user to which the content item was provided for display, a query or keyword field identifying a search query or keyword based on which the content item was selected for display and an action type field identifying an action, if any, that was taken on the content item upon providing the content item for display.

The content activity management module 135 can be configured to identify entries in the ad serving event table that correspond to the content items or ads related to the housing industry or employment industry. In some implementations, the content activity management module 135 can extract or filter the entries of ads related to the employment industry from the plurality of entries in the ad serving event table to determine conversion metrics related to the employment industry. The content activity management module 135 can identify entries in the ad serving event table that correspond to the content items or ads related to the employment industry based on queries or keywords associated with the ad serving event. A content item is selected for display based on a search query provided by a user or based on a keyword on which an advertiser placed a bid to provide the content item for display. The content activity management module 135 can identify content items related to the employment industry based on the query or keyword used for selecting the content item for display. The content activity management module 135 can identify a list of keywords or keyword clusters corresponding to the employment industry and select content items based on matching the query or keyword used for selecting the content item for display with the list of keywords or keyword clusters.

The list of keywords or keyword clusters can be identified by the content activity management table by parsing through a plurality of web pages identified as related to the employment industry. In some implementations, the content activity management module 135 can identify a list of advertisers related to the employment industry. In some implementations, the list of advertisers can include advertisers related to the employment industry by parsing one or more web pages of the advertiser and identifying keyword clusters and determining, from the keyword clusters and a frequency of keywords in the web pages, that the advertiser is related to the employment industry. In some implementations, the advertisers can be identified based on a list provided manually. In some implementations, the content activity management module 135 can identify a list of advertisers based on the keywords on which they bid to serve content items. Examples of keywords related to the employment industry include careers, jobs, employment, among others.

Figure 3A:
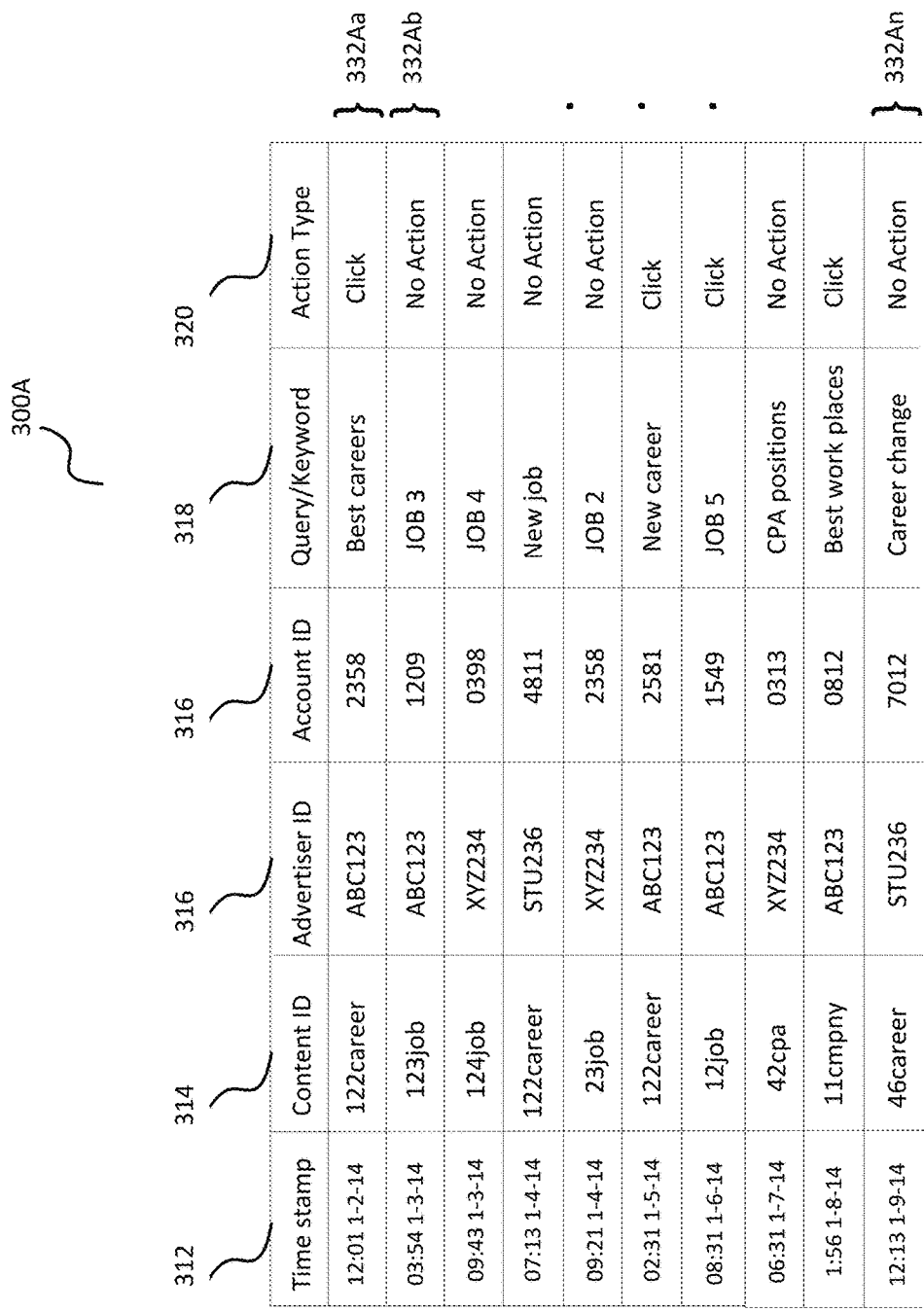
FIG. 3A is a table including entries relating to advertisements provided for display at one or more computing devices based on queries or keywords related to the employment industry, according to an illustrative implementation.

FIG. 3A illustrates a table including entries relating to advertisements provided for display at one or more computing devices based on queries or keywords related to the employment industry. The table includes a plurality of fields, including but not limited to a timestamp field 312, a content identifier field 314, an advertiser identifier field 316, an account identifier field 320, a query or keyword field 320, and an action type field 322. The timestamp field 312 can include a value identifying a date and time at which a particular content item was provided for display. The content identifier field 314 can include a value identifying the content item provided for display. The advertiser identifier field 316 can include a value identifying a particular advertiser providing the content item for display. The account identifier field 318 can include a value identifying a computing device or a user to which the content item was provided for display, the query or keyword field 320 can include a value identifying a search query or keyword based on which the content item was selected for display. The action type field 322 can include a value identifying an action, if any, that was taken on the content item upon providing the content item for display. The table also includes a plurality of entries 332Aa-332An (hereinafter entries 332A). Each entry in the table corresponds to an ad serving event in which a content item or ad was provided for display at an end user computing device. Each ad can be selected based on a query or keyword related to the employment industry. The table 300A can be generated by selecting entries 332A that correspond to ads that were selected based on a query or keyword related to the employment industry. In some implementations, the content activity management module 135 can generate the table or include entries in the table by applying a filter on a database including entries corresponding to ads provided for display.

In some implementations, the content activity management module 135 can extract or filter the entries of ads related to the housing industry from the plurality of entries in the ad serving event table to determine conversion metrics related to the housing industry. The content activity management module 135 can identify entries in the ad serving event table that correspond to the content items or ads related to the housing industry based on queries or keywords associated with the ad serving event. A content item is selected for display based on a search query provided by a user or based on a keyword on which an advertiser placed a bid to provide the content item for display. The content activity management module 135 can identify content items related to the housing industry based on the query or keyword used for selecting the content item for display. The content activity management module 135 can identify a list of keywords or keyword clusters corresponding to the housing industry and select content items based on matching the query or keyword used for selecting the content item for display with the list of keywords or keyword clusters.

The list of keywords or keyword clusters can be identified by the content activity management table by parsing through a plurality of web pages identified as related to the housing industry. In some implementations, the content activity management module 135 can identify a list of advertisers related to the housing industry. In some implementations, the list of advertisers can include advertisers related to the housing industry by parsing one or more web pages of the advertiser and identifying keyword clusters and determining, from the keyword clusters and a frequency of keywords in the web pages, that the advertiser is related to the housing industry. In some implementations, the advertisers can be identified based on a list provided manually. In some implementations, the content activity management module 135 can identify a list of advertisers based on the keywords on which they bid to serve content items. Examples of keywords related to the housing industry include apartments, moving, new home, condos, among others.

FIG. 3B illustrates a table including entries relating to advertisements provided for display at one or more computing devices based on queries or keywords related to the housing industry. The table 300B, similar to table 300A, includes a plurality of fields, including but not limited to a timestamp field 312, a content identifier field 314, an advertiser identifier field 316, an account identifier field 318, a query or keyword field 320, and an action type field 322. The timestamp field 312 can include a value identifying a date and time at which a particular content item was provided for display. The content identifier field 314 can include a value identifying the content item provided for display. The advertiser identifier field 316 can include a value identifying a particular advertiser providing the content item for display. The account identifier field 318 can include a value identifying a computing device or a user to which the content item was provided for display, the query or keyword field 320 can include a value identifying a search query or keyword based on which the content item was selected for display. The action type field 322 can include a value identifying an action, if any, that was taken on the content item upon providing the content item for display. The table 300B also includes a plurality of entries 332Ba-332An (hereinafter entries 332B). Each entry in the table corresponds to an ad serving event in which a content item or ad was provided for display at an end user computing device. Each ad can be selected based on a query or keyword related to the housing industry. The table 300B can be generated by selecting entries 332B that correspond to ads that were selected based on a query or keyword related to the housing industry. In some implementations, the content activity management module 135 can generate the table or include entries in the table by applying a filter on a database including entries corresponding to ads provided for display.

Referring now also to FIG. 1 again, the content activity management module 135 can identify a plurality of ads provided for display to a plurality of identifiers. Each of the plurality of ads can be related to one of a housing industry or an employment industry. In some implementations, the plurality of identifiers correspond to account identifiers of users of computing devices. In some implementations, the content activity management module 135 can maintain one or more tables that include entries, each of which correspond to an ad serving event. The content activity management module 135 110 can add an entry to one or more tables each time an ad serving event occurs. That is, each time an ad is served on a computing device. The entry can include values for one or more fields, including a timestamp field, a content identifier field, an account identifier field, a query or keyword field, and an action type field.

In some implementations, the content selection module 130 can receive a request to serve an ad or content item to a computing device. The request can include an account identifier associated with a user of the computing device on which to serve the ad. The request can also include additional information, including but not limited to, one or more keywords corresponding to an information resource (for example, a web page) on which to display the ad. In some implementations, the ad can be displayed along with search results. In some such implementations, the request can include the search query corresponding to the search results with which to display the content item. The content selection module 130 can, in response to the request, identify or select a content item to serve at the computing device of the user. The content activity management module 135 can then include an entry corresponding to the ad serving event that includes the time at which the ad was served, a content identifier identifying the content item selected for display, the account identifier of the user, the search query or keyword included in the request and an action type taken by the user.

In some implementations, the content activity management module 135 can identify one or more information resources relating to the housing industry. The content activity management module 135 can then perform keyword clustering on the identified information resources. The content activity management module 135 can determine one or more keyword clusters that appear in each of the information resources relating to the housing industry. The content activity management module 135 can associate these keyword clusters with the housing industry. In some such implementations, the content activity management module 135 can identify the plurality of ads related to the housing industry by identifying ads that were selected for display based on a keyword included in the one or more keyword clusters that appear in each of the information resources relating to the housing industry.

Similarly, in some implementations, the content activity management module 135 can identify one or more information resources relating to the employment industry. The content activity management module 135 can then perform keyword clustering on the identified information resources. The content activity management module 135 can determine one or more keyword clusters that appear in each of the information resources relating to the employment industry. The content activity management module 135 can associate these keyword clusters with the employment industry. In some such implementations, the content activity management module 135 can identify the plurality of ads related to the employment industry by identifying the plurality of ads related to the employment industry includes identifying ads that were selected for display based on a keyword included in the one or more keyword clusters that appear in each of the information resources relating to the employment industry.

In some implementations, the content activity management module 135 can determine if an ad belongs to either the housing industry or the employment industry by analyzing the landing page of the ad. In some implementations, the content activity management module 135 can parse through the landing page to identify keyword clusters. Based on the keyword clusters, the content activity management module 135 can determine if the ad belongs to either the housing industry or the employment industry.

The content activity management module 135 can be configured to identify, for an advertiser providing a subset of the identified plurality of ads, one or more identifiers to which the subset of the identified plurality of ads are provided for display. In some implementations, the content activity management module 135 can receive a request from an advertiser to provide conversion metrics for advertisements served by the advertiser. In some implementations, the advertiser can be related to one of the housing industry or the employment industry and as such, the advertisements served by the advertiser are likely also to be related to the housing industry or the employment industry. The content activity management module 135 can then identify, from the database including one or more advertisement serving event tables including a plurality of events corresponding to advertisement serving events, a subset of entries that correspond to ads of the advertiser. In some implementations, the subset of entries correspond to ads of the advertiser that relate to either the housing industry or the employment industry. In some such implementations, the content activity management module 135 can filter or extract entries from the tables based on the query or keyword related to the housing industry or the employment industry prior to identifying a subset of entries that correspond to ads of the advertiser. For instance, the advertiser can have an advertiser ID of "ABC123." As shown in FIG. 3A, entries 332Aa and 332Ab among others would be identified. The content activity management module 135 can then determine, from the entries that include the advertiser identifier that matches the advertiser requesting the conversion metrics, a list of one or more account identifiers corresponding to users to whom the ads were provided for display.

The content activity management module 135 can identify the one or more account identifiers to which the subset of the identified plurality of ads are provided for display. The subset including the ads corresponding to the advertiser requesting the conversion metrics. The content activity management module 135 can generate a list of the one or more account identifiers. These account identifiers correspond to users to whom the ads were provided for display.

The conversion metric determination module 140 can determine, from a location database that includes location information of the plurality of identifiers, a number of identifiers of the one or more identifiers to which the subset of the identified plurality of ads are provided for display that changed locations. The conversion metric determination module 140 can determine a number of account identifiers of the list of account identifiers who changed their address after receiving the ad of the advertiser. The conversion metric determination module 140 can determine the number of account identifiers that changed their address using the location database that includes current and historical location information of the account identifier.

The location database can be maintained by the data processing system or by another system in communication with the data processing system. The location database can maintain location information of identifiers. In some implementations, the location database can include one or more location tables. Each location table can include a plurality of fields, including an account identifier field identifying an account, a home location field identifying a home location of the user associated with the account identifier and an employment location of the user associated with the account identifier. In some implementations, the home location field and employment location field can include physical addresses. The location table can include one or more additional fields that include location information associated with other locations associated with the account identifier, including but not limited to places the user associated with the account identifier frequents. In some implementations, the home location field or employment location field can include location information of a particular user based on information provided by the user. In some implementations, the home location field or employment location field can include location information of a particular user based on information derived from browsing history data of the user.

Referring briefly to FIGS. 4A and 4B, FIG. 4A is a table including entries relating to identifiers and their associated home and employment addresses at a first time and FIG. 4B is a table including entries relating to identifiers and their associated home and employment addresses at a second time, according to an illustrative implementation. The table 400A includes an account identifier field 410, a home location field 420 and a work location field 430. The table 400A also includes a plurality of entries 450a-450j, each of which correspond to a particular account identifier. Similarly, table 400B includes an account identifier field 410, a home location field 420 and a work location field 430. The table 400A also includes a plurality of entries 450a-450j, each of which correspond to a particular account identifier.

The difference between tables 400A and 400B is based on a time to which the information included in each of the tables corresponds. Table 400A includes home and work location information of a plurality of account identifiers during a first time period, while table 400B includes home and work location information of the same plurality of account identifiers during a second time period. As shown by comparison of tables 400A and 400B, account identifiers 6358, 0398 and 7012 changed their home locations, while account identifiers 0812, 2581 and 2358 changed their work locations.

Upon closer analysis of FIGS. 3A-4B, account identifier 6358 was shown content identifier 122 home corresponding to the entry 322Ba shown in FIG. 3B. It is possible that the conversion of account identifier 6358 can be attributed to the content item corresponding to content identifier 122 home. Similar comparisons can be made for each of the account identifiers that changed their home or work address.

In some implementations, the home location field can include location information according to one or more home location determination policies. The home location determination policies can include one or more rules for determining a home location of a user. For instance, the home location determination policies can include rules that are based on the time of day or the day of the week to determine a particular location. For instance, a user is likely to be at home during 10 pm and 8 am on weekdays and weekends, and as such, location information received from communications with a computing device of the user during those hours can correspond to a home location of the user. The home location determination policies can include additional rules including updating the home location of a user based on a sustained amount of activity or information gathering. This is to ensure that the home location of the user is not updated simply because the user went to another place for a week on vacation.

In some implementations, the employment location field can include location information according to one or more employment location determination policies. The employment location determination policies can include one or more rules for determining an employment location of a user. For instance, the employment location determination policies can include rules that are based on the time of day or the day of the week to determine a particular location. For instance, a user is likely to be at work during 9 am and 6 pm on weekdays, and as such, location information received from communications with a computing device of the user during those hours can correspond to a work location of the user. The employment location determination policies can include additional rules including updating the employment location of a user based on a sustained amount of activity or information gathering. This is to ensure that the employment location of the user is not updated simply because the user went to another place for an extended period of time for work.

The location database can also include historical location information, including but not limited to previous home addresses, previous employment addresses, among others. In some implementations, the location database can include temporal information identifying a time period during which a particular user was living at a particular home address or working at a particular employment address. In some implementations, the location database can maintain separate tables for each time period. For instance, the location database can include a first location information table corresponding to a first time and a second location information table corresponding to a second time. In some implementations, the location database can include information from both the first location information table and the second location information table in a single location information table.

The conversion metric determination module 140 can identify a number of identifiers that changed their home location address via the location database. The conversion metric determination module 140 can provide a list of identifiers to which the subset of the identified plurality of ads are provided for display.

In some implementations, the conversion metric determination module 140 can determine, from the one or more account identifiers to which the subset of the identified plurality of ads are provided for display, the number of identifiers that changed locations using the location database. In particular, the conversion metric determination module 140 can provide, to the location database, a request including the one or more identifiers to which the subset of the identified plurality of ads are provided for display. The conversion metric determination module 140 can then receive a response to the request that identifies the number of identifiers of the one or more identifiers to which the subset of the identified plurality of ads are provided for display that changed locations.

In some implementations, the data processing system or some other entity maintaining the location database can, for an account identifier that was served an ad of the advertiser that is requesting conversion metrics that relates to either the housing or employment industries, identify a home address or an employment address of the account identifier corresponding to the time the ad was served and identify a home address or employment address of the account identifier most recently identified as the home address or employment address of the account identifier. The entity maintaining the location database can then determine if the home address or employment address for the account identifier has changed from the time the ad was served to the most recently identified home address or employment address of the account identifier. The entity repeats this for each account identifier that was served an ad of the advertiser that is requesting conversion metrics that relates to either the housing or employment industries. The entity can then determine, from the one or more account identifiers to which the subset of the identified plurality of ads are provided for display, the number of account identifiers that changed either their home address or employment address using the location database. The entity can then provide to the data processing system (if the entity is different) the number of account identifiers that changed their home address (if the advertiser is in the housing industry) or their employment address (if the advertiser is in the employment industry).

The conversion metric determination module 140 can be configured to provide, to the advertiser, a conversion metric based on the number of identifiers that changed locations. In some implementations, the conversion metric determination module 140 can be configured to provide the conversion metric to the advertiser if the number of identifiers that changed locations is greater than a predetermined threshold. In some implementations, the predetermined threshold is a fixed number, for example, 50. In some implementations, the predetermined threshold is based on a percentage of identifiers included in the list of identifiers that were served ads from the advertiser. The predetermined threshold can be set to a number to prevent the advertiser from determining advertising related information relating to competitors of the advertiser.

The conversion metric determination module 140 can determine a ratio of the number of account identifiers that changed their home address or employment address to the number of account identifiers to which the subset of the identified plurality of ads are provided for display. This ratio corresponds to a conversion metric indicating how many of the users that were provided the ad for display changed their home address or their employment address. Although a user may have changed their home or employment address for a wide variety of reasons, this ratio can serve as a valuable metric for determining a performance of ads relating to the housing or employment industry, especially, when evaluating a large number of conversions.

The conversion metric determination module 140 can provide the conversion metric for display on a user interface for the advertiser in response to receiving a request from the advertiser. In some implementations, additional conversions can be determined based on one or more other parameters. In some implementations, the conversion metrics can be more specific or granular. For instance, the conversion metric determination module 140 can determine the conversion metrics for ads that were shown based on a specific keyword or query by applying filters to the ad serving event table that includes entries for each ad provided for display. Conversion metrics based on timestamps, action types, queries/keywords, or advertisers can be computed by applying appropriate filters to the data set, which corresponds to the entries in the ad serving event table. In addition, the conversion metrics can be based on one or more other fields that are included in each entry of the ad serving event table. For instance, if the identity of the information resource on which the ad is served is included in the ad serving event table, conversion metrics based on the information resource on which the ad is served can be determined.

Figure 5:
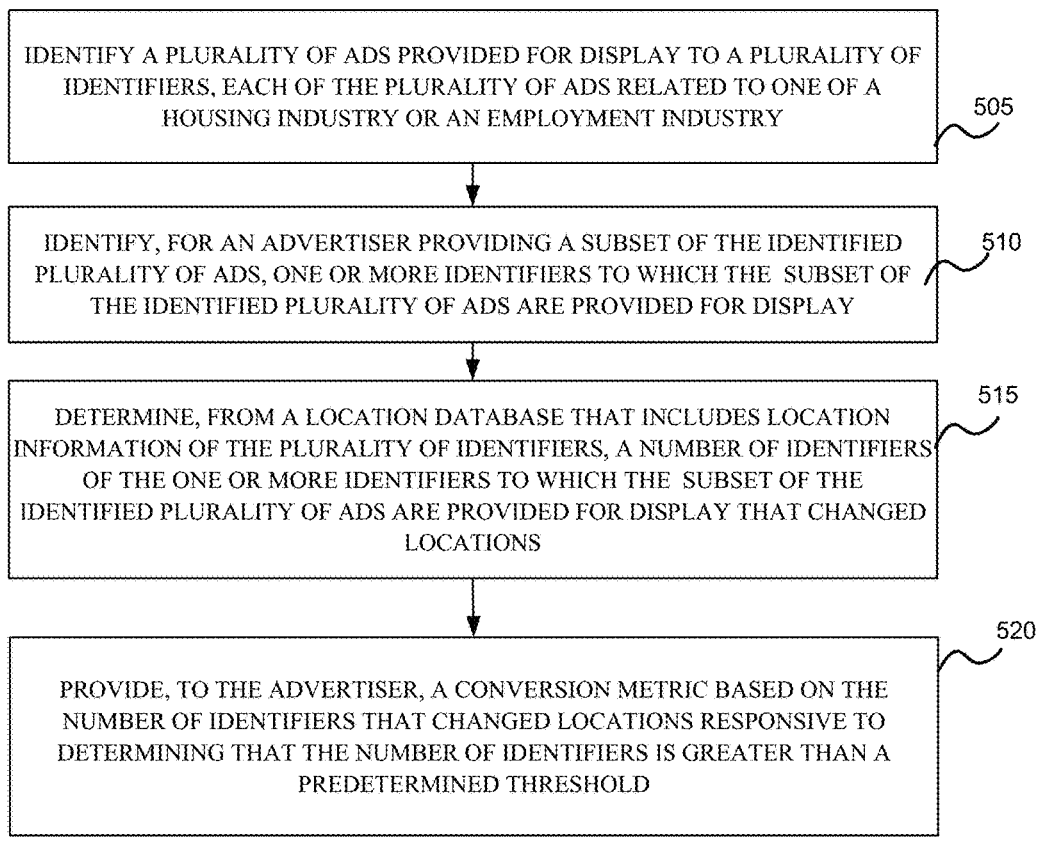
FIG. 5 is a flow diagram depicting a method of detecting house or employment change conversions, according to an illustrative implementation.

FIG. 5 is a flow diagram depicting a method 500 for detecting housing or employment change conversions based on the location information. The functionality described in the method can be performed by a data processing system, such as the data processing system 110 or the various modules of the data processing system 110 shown in FIG. 1. The data processing system can identify a plurality of ads provided for display to a plurality of identifiers (BLOCK 505). Each of the plurality of ads is related to one of a housing industry or an employment industry. The data processing system can identify, for an advertiser providing a subset of the identified plurality of ads, one or more identifiers to which the subset of the identified plurality of ads are provided for display (BLOCK 510). The data processing system can determine, from a location database that includes location information of the plurality of identifiers, a number of identifiers of the one or more identifiers to which the subset of the identified plurality of ads are provided for display that changed locations (BLOCK 515). The data processing system can also provide, to the advertiser, a conversion metric based on the number of identifiers that changed locations responsive to determining that the number of identifiers is greater than a predetermined threshold (BLOCK 520).

The data processing system can identify a plurality of ads provided for display to a plurality of identifiers (BLOCK 505). Each of the plurality of ads is related to one of a housing industry or an employment industry. In some implementations, the plurality of identifiers correspond to account identifiers of users of computing devices. In some implementations, the data processing system can maintain one or more tables that include entries, each of which correspond to an ad serving event. The data processing system 110 can add an entry to one or more tables each time an ad serving event occurs. That is, each time an ad is served on a computing device. The entry can include values for one or more fields, including a timestamp field, a content identifier field, an account identifier field, a query or keyword field, and an action type field.

In some implementations, the data processing system can receive a request to serve an ad or content item to a computing device. The request can include an account identifier associated with a user of the computing device on which to serve the ad. The request can also include additional information, including but not limited to, one or more keywords corresponding to an information resource (for example, a web page) on which to display the ad. In some implementations, the ad can be displayed along with search results. In some such implementations, the request can include the search query corresponding to the search results with which to display the content item. The data processing system can, in response to the request, identify or select a content item to serve at the computing device of the user. The data processing system can then include an entry corresponding to the ad serving event that includes the time at which the ad was served, a content identifier identifying the content item selected for display, the account identifier of the user, the search query or keyword included in the request and an action type taken by the user.

In some implementations, the data processing system can identify one or more information resources relating to the housing industry. The data processing system can then perform keyword clustering on the identified information resources. The data processing system can determine one or more keyword clusters that appear in each of the information resources relating to the housing industry. The data processing system can associate these keyword clusters with the housing industry. In some such implementations, the data processing system can identify the plurality of ads related to the housing industry by identifying ads that were selected for display based on a keyword included in the one or more keyword clusters that appear in each of the information resources relating to the housing industry.

Similarly, in some implementations, the data processing system can identify one or more information resources relating to the employment industry. The data processing system can then perform keyword clustering on the identified information resources. The data processing system can determine one or more keyword clusters that appear in each of the information resources relating to the employment industry. The data processing system can associate these keyword clusters with the employment industry. In some such implementations, the data processing system can identify the plurality of ads related to the employment industry by identifying the plurality of ads related to the employment industry includes identifying ads that were selected for display based on a keyword included in the one or more keyword clusters that appear in each of the information resources relating to the employment industry.

In some implementations, the data processing system can determine if an ad belongs to either the housing industry or the employment industry by analyzing the landing page of the ad. In some implementations, the data processing system can parse through the landing page to identify keyword clusters. Based on the keyword clusters, the data processing system can determine if the ad belongs to either the housing industry or the employment industry.

The data processing system can identify, for an advertiser providing a subset of the identified plurality of ads, one or more identifiers to which the subset of the identified plurality of ads are provided for display (BLOCK 510). In some implementations, the data processing system can receive a request from an advertiser to provide conversion metrics for advertisements served by the advertiser. In some implementations, the advertiser can be related to one of the housing industry or the employment industry and as such, the advertisements served by the advertiser are likely also to be related to the housing industry or the employment industry. The data processing system can then identify, from the database including one or more advertisement serving event tables including a plurality of events corresponding to advertisement serving events, a subset of entries that correspond to ads of the advertiser. In some implementations, the subset of entries correspond to ads of the advertiser that relate to either the housing industry or the employment industry. In some such implementations, the data processing system can filter or extract entries from the tables based on the query or keyword related to the housing industry or the employment industry prior to identifying a subset of entries that correspond to ads of the advertiser. For instance, the advertiser can have an advertiser ID of "ABC123." As shown in FIG. 3A, entries 332Aa and 332Ab among others would be identified. The data processing system can then determine, from the entries that include the advertiser identifier that matches the advertiser requesting the conversion metrics, a list of one or more account identifiers corresponding to users to whom the ads were provided for display.

The data processing system can identify the one or more account identifiers to which the subset of the identified plurality of ads are provided for display. The subset including the ads corresponding to the advertiser requesting the conversion metrics. The data processing system can generate a list of the one or more account identifiers. These account identifiers correspond to users to whom the ads were provided for display.

The data processing system can determine, from a location database that includes location information of the plurality of identifiers, a number of identifiers of the one or more identifiers to which the subset of the identified plurality of ads are provided for display that changed locations (BLOCK 515). The data processing system can determine a number of account identifiers of the list of account identifiers who changed their address after receiving the ad of the advertiser. The data processing system can determine the number of account identifiers that changed their address using the location database that includes present and historical location information of the account identifier.

The location database can be maintained by the data processing system or by another system in communication with the data processing system. The location database can maintain location information of identifiers. In some implementations, the location database can include one or more location tables. Each location table can include a plurality of fields, including an account identifier field identifying an account, a home location field identifying a home location of the user associated with the account identifier and an employment location of the user associated with the account identifier. In some implementations, the home location field and employment location field can include physical addresses. The location table can include one or more additional fields that include location information associated with other locations associated with the account identifier, including but not limited to places the user associated with the account identifier frequents. In some implementations, the home location field or employment location field can include location information of a particular user based on information provided by the user. In some implementations, the home location field or employment location field can include location information of a particular user based on information derived from browsing history data of the user.

In some implementations, the home location field can include location information according to one or more home location determination policies. The home location determination policies can include one or more rules for determining a home location of a user. For instance, the home location determination policies can include rules that are based on the time of day or the day of the week to determine a particular location. For instance, a user is likely to be at home during 10 pm and 8 am on weekdays and weekends, and as such, location information received from communications with a computing device of the user during those hours can correspond to a home location of the user. The home location determination policies can include additional rules including updating the home location of a user based on a sustained amount of activity or information gathering. This is to ensure that the home location of the user is not updated simply because the user went to another place for a week on vacation.

In some implementations, the employment location field can include location information according to one or more employment location determination policies. The employment location determination policies can include one or more rules for determining an employment location of a user. For instance, the employment location determination policies can include rules that are based on the time of day or the day of the week to determine a particular location. For instance, a user is likely to be at work during 9 am and 6 pm on weekdays, and as such, location information received from communications with a computing device of the user during those hours can correspond to a work location of the user. The employment location determination policies can include additional rules including updating the employment location of a user based on a sustained amount of activity or information gathering. This is to ensure that the employment location of the user is not updated simply because the user went to another place for an extended period of time for work.

The location database can also include historical location information, including but not limited to previous home addresses, previous employment addresses, among others. In some implementations, the location database can include temporal information identifying a time period during which a particular user was living at a particular home address or working at a particular employment address. In some implementations, the location database can maintain separate tables for each time period. For instance, the location database can include a first location information table corresponding to a first time and a second location information table corresponding to a second time. In some implementations, the location database can include information from both the first location information table and the second location information table in a single location information table.

The data processing system can identify a number of identifiers that changed their home location address via the location database. The data processing system can provide a list of identifiers to which the subset of the identified plurality of ads are provided for display.

In some implementations, the data processing system can determine, from the one or more account identifiers to which the subset of the identified plurality of ads are provided for display, the number of identifiers that changed locations using the location database. In particular, the data processing system can provide, to the location database, a request including the one or more identifiers to which the subset of the identified plurality of ads are provided for display. The data processing system can then receive a response to the request that identifies the number of identifiers of the one or more identifiers to which the subset of the identified plurality of ads are provided for display that changed locations.

In some implementations, the data processing system or some other entity maintaining the location database can, for an account identifier that was served an ad of the advertiser that is requesting conversion metrics that relates to either the housing or employment industries, identify a home address or an employment address of the account identifier corresponding to the time the ad was served and identify a home address or employment address of the account identifier most recently identified as the home address or employment address of the account identifier. The entity maintaining the location database can then determine if the home address or employment address for the account identifier has changed from the time the ad was served to the most recently identified home address or employment address of the account identifier. The entity repeats this for each account identifier that was served an ad of the advertiser that is requesting conversion metrics that relates to either the housing or employment industries. The entity can then determine, from the one or more account identifiers to which the subset of the identified plurality of ads are provided for display, the number of account identifiers that changed either their home address or employment address using the location database. The entity can then provide to the data processing system (if the entity is different) the number of account identifiers that changed their home address (if the advertiser is in the housing industry) or their employment address (if the advertiser is in the employment industry).

The data processing system can also provide, to the advertiser, a conversion metric based on the number of identifiers that changed locations responsive to determining that the number of identifiers is greater than a predetermined threshold (BLOCK 520). In some implementations, the data processing system can provide the conversion metric to the advertiser if the number of identifiers that changed locations is greater than a predetermined threshold. In some implementations, the predetermined threshold is a fixed number, for example, 50. In some implementations, the predetermined threshold is based on a percentage of identifiers included in the list of identifiers that were served ads from the advertiser. The predetermined threshold can be set to a number to prevent the advertiser from determining advertising related information relating to competitors of the advertiser.

The data processing system can determine a ratio of the number of account identifiers that changed their home address or employment address to the number of account identifiers to which the subset of the identified plurality of ads are provided for display (as determined in BLOCK 510). This ratio corresponds to a conversion metric indicating how many of the users that were provided the ad for display changed their home address or their employment address. Although a user may have changed their home or employment address for a wide variety of reasons, this ratio can serve as a valuable metric for determining a performance of ads relating to the housing or employment industry, especially, when evaluating a large number of conversions.

The data processing system can provide the conversion metric for display on a user interface for the advertiser in response to receiving a request from the advertiser. In some implementations, additional conversions can be determined based on one or more other parameters. In some implementations, the conversion metrics can be more specific or granular. For instance, the data processing system can determine the conversion metrics for ads that were shown based on a specific keyword or query by applying filters to the ad serving event table that includes entries for each ad provided for display. Conversion metrics based on timestamps, action types, queries/keywords, or advertisers can be computed by applying appropriate filters to the data set, which corresponds to the entries in the ad serving event table.

Figure 6:
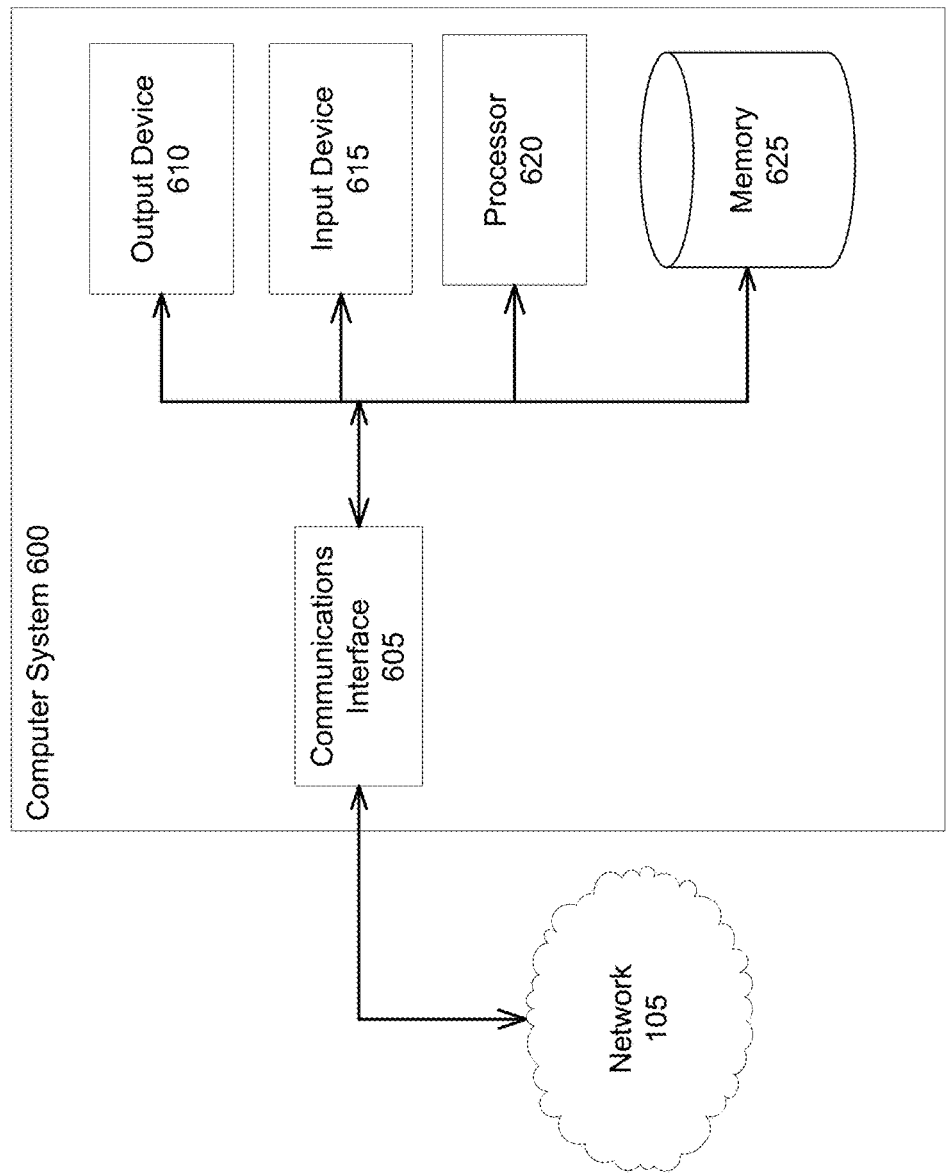
FIG. 6 is a block diagram illustrating a general architecture for a computer system that may be employed to implement elements of the systems and methods described and illustrated herein, according to an illustrative implementation.

FIG. 6 shows the general architecture of an illustrative computer system 600 that may be employed to implement any of the computer systems discussed herein (including the system 110 and its components such as the content selection module 130, the content activity management module 135 and the conversion metric determination module 140) in accordance with some implementations. The computer system 600 can be used to provide information via the network 105 for display. The computer system 600 of FIG. 6 comprises one or more processors 620 communicatively coupled to memory 625, one or more communications interfaces 605, and one or more output devices 610 (e.g., one or more display units) and one or more input devices 615. The processors 620 can be included in the data processing system 110 or the other components of the system 110 such as the content selection module 130, the content activity management module 135 and the conversion metric determination module 140.

In the computer system 600 of FIG. 6, the memory 625 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 110 of FIG. 1, the data processing system 110 can include the memory 625 to store information related to the availability of inventory of one or more content units, reservations of one or more content units, among others. The memory 625 can include the database 145. The processor(s) 620 shown in FIG. 6 may be used to execute instructions stored in the memory 625 and, in so doing, also may read from or write to the memory various information processed and or generated pursuant to execution of the instructions.

The processor 620 of the computer system 600 shown in FIG. 6 also may be communicatively coupled to or control the communications interface(s) 605 to transmit or receive various information pursuant to execution of instructions. For example, the communications interface(s) 605 may be coupled to a wired or wireless network, bus, or other communication means and may therefore allow the computer system 600 to transmit information to or receive information from other devices (e.g., other computer systems). While not shown explicitly in the system of FIG. 1, one or more communications interfaces facilitate information flow between the components of the system 60. In some implementations, the communications interface(s) may be configured (e.g., via various hardware components or software components) to provide a website as an access portal to at least some aspects of the computer system 600. Examples of communications interfaces 605 include user interfaces (e.g., web pages), through which the user can communicate with the data processing system 60.

The output devices 610 of the computer system 600 shown in FIG. 6 may be provided, for example, to allow various information to be viewed or otherwise perceived in connection with execution of the instructions. The input device(s) 615 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The content selection module 130, the content activity management module 135 and the conversion metric determination module 140 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 600 or system 110 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the content selection module 130, the content activity management module 135 and the conversion metric determination module 140 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to detecting housing or employment change conversions based on location information, the systems and methods described herein can include applied to other environments in which data included in a log database used and compared to data corresponding to previous requests for content and responsive to determining a change in the data, identifying one or more content items to which to attribute the credit for the change. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method for providing conversion metrics for content items related to the housing industry or the employment industry, comprising:

maintaining, by a data processing system, at least one location database including, for each client device of a plurality of client devices, respective home locations or employment locations corresponding to at least two time periods;

maintaining, by the data processing system, a serving event database including a plurality of entries, each entry corresponding to a content item served to a client device of the plurality of client devices, and including a time stamp indicative of a time instant at which the content item was provided for display on that client device;

receiving, by the data processing system, from a content provider, a request for at least one performance metric of a particular content item of the content provider related to one of a housing industry or employment industry;

identifying, by the data processing system, for the content provider, using the serving event database, one or more of the plurality of client devices to which the particular content item was provided for display;

determining, by the data processing system, for each of the one or more identified client devices, a first home or employment location associated with a first time instant at which the particular content item was provided for display to that client device and determining, using the location database, a second home or employment location associated with that client device at a second time instant subsequent to the first time instant;

determining a number of client devices to which the particular content item was provided for display that changed home or employment locations based on the determined first home or employment location and second home or employment location for each client device of the one or more identified client devices; and providing, by the data processing system, responsive to the request for at least one performance metric, to the content provider, the at least one performance metric based on the number of client device that changed home or employment locations.

2. The method of claim 1, further comprising:
identifying a plurality of search queries representative of one of the housing industry or the employment industry; and
providing, for display, in response to the search queries, the particular content item to the one or more of the plurality of client devices.

3. The method of claim 1, further comprising:
identifying one or more information resources relating to the housing industry;
performing keyword clustering on the identified information resources;
determining one or more keyword clusters that appear in each of the information resources relating to the housing industry; and
identifying the particular content item as related to the housing industry by identifying content items that were selected for display based on a keyword included in the one or more keyword clusters that appear in each of the information resources relating to the housing industry.

4. The method of claim 1, further comprising:
   identifying one or more information resources relating to the employment industry;
   performing keyword clustering on the identified information resources;
   determining one or more keyword clusters that appear in each of the information resources relating to the employment industry; and
   identifying the particular content item as related to the employment industry by identifying content items that were selected for display based on a keyword included in the one or more keyword clusters that appear in each of the information resources relating to the employment industry.

5. The method of claim 1, wherein determining, the number of client devices to which the particular content item was provided for display that changed home or employment locations, includes:
   providing, to the location database, a request including one or more device identifiers of the one or more identified client devices to which the particular content item was provided for display; and
   receiving a response to the request, the response identifying the number of client devices to which the particular content item was provided for display that changed home or employment locations.

6. The method of claim 1 further comprising parsing landing pages of content items and identifying keywords relating to the housing industry or the employment industry.

7. The method of claim 1, wherein each entry of the serving event database further includes:
   an action field identifying any action taken on the content item, and
   a keyword filed identifying one or more keywords according to which the content item was selected for display.

8. A system for providing conversion metrics for content items related to the housing industry or the employment industry, comprising:
   a data processing system having a content selection module, a content detection module, and a conversion metric determination module, the data processing system configured to:
      maintain at least one location database including, for each client device of a plurality of client devices, respective home locations or employment locations corresponding to at least two time periods;
      maintain a serving event database including a plurality of entries, each entry corresponding to a content item served to a client device of the plurality of client devices, and including a time stamp indicative of a time instant at which the content item was provided for display on that client device;
      receive, from a content provider, a request for at least one performance metric of a particular content item of the content provider related to one of a housing industry or employment industry;
      identify, for the content provider, using the serving event database, one or more of the plurality of client devices to which the particular content item was provided for display;
      determine for each of the one or more identified client devices, a first home or employment location associated with a first time instant at which the particular content item was provided for display to that client device and determining, using the location database, a second home or employment location associated with that client device at a second time instant subsequent to the first time instant;
      determine a number of client devices which the particular content item was provided for display that changed home or employment locations based on the determined first home or employment location and second home or employment location for each client device of the one or more identified client devices; and
      provide, responsive to the request for at least one performance metric, to the content provider, the at least one performance metric based on the number of client devices that changed home or employment locations.

9. The method of claim 8, wherein the data processing system is further configured to:
   identify a plurality of search queries representative of one of the housing industry or the employment industry; and
   provide, for display, in response to the search queries, the particular content item to the one or more of the plurality of client devices.

10. The system of claim 8, wherein the data processing system is further configured to:
    identify one or more information resources relating to the housing industry;
    perform keyword clustering on the identified information resources;
    determine one or more keyword clusters that appear in each of the information resources relating to the housing industry; and;
    identify the particular content item as related to the housing industry by identifying content items that were selected for display based on a keyword included in the one or more keyword clusters that appear in each of the information resources relating to the housing industry.

11. The system of claim 8, wherein the data processing system is further configured to:
    identify one or more information resources relating to the employment industry;
    perform keyword clustering on the identified information resources;
    determine one or more keyword clusters that appear in each of the information resources relating to the employment industry; and
    identify the particular content item as related to the employment industry by identifying content items that were selected for display based on a keyword included in the one or more keyword clusters that appear in each of the information resources relating to the employment industry.

12. The system of claim 8, wherein to determine the number of client devices to which the particular content item was provided for display that changed home or employment locations, the data processing system is configured to:
    provide, to the location database, a request including one or more device identifiers of the one or more client devices to which the particular content item was provided for display; and
    receive a response to the request, the response identifying the number of client devices to which the particular content item was provided for display that changed home or employment locations.

13. The system of claim 8, wherein the data processing system is further configured to parse landing pages of content items and identify keywords relating to the housing industry or the employment industry.

14. The system of claim 8, wherein each entry of the serving event database further includes:
- an action field identifying any action taken on the content item, and
- a keyword field identifying one or more keywords according to which the content item was selected for display.

15. A computer-readable storage medium having computer-executable instructions stored thereon, which when executed by one or more processors, cause the one or more processors to perform operations comprising:
- maintaining at least one location database including, for each client device of a plurality of client devices, respective home locations or employment locations corresponding to at least two time periods;
- maintaining a serving event database including a plurality of entries, each entry corresponding to a content item served to a client device of the plurality of client devices, and including a time stamp indicative of a time instant at which the content item was provided for display on that client device;
- receiving, from a content provider, a request for at least one performance metric of a particular content item of the content provider related to one of a housing industry or employment industry;
- identifying, for the content, using the serving event database, one or more of the plurality of client devices to which the particular content item was provided for display;
- determining, for each of the one or more identified client devices, a first home or employment location associated with a first time instant at which the particular content item was provided for display to that client device and determining, using the location database, a second home or employment location associated with that client device at a second time instant subsequent to the first time instant;
- determining a number of client devices to which the particular content item was provided for display that changed home or employment locations based on the determined first home or employment location and second home or employment location for each client device of the one or more identified client devices; and
- providing, responsive to the request for at least one performance metric, to the content provider, the at least one performance metric based on the number of client device that changed home or employment locations.

16. The computer-readable storage medium of claim 15, further comprising:
- identifying a plurality of search queries representative of one of the housing industry or the employment industry; and
- providing, for display, in response to the search queries, the particular content items to the one or more of the plurality of client devices.

17. The computer-readable storage medium of claim 15, further comprising:
- identifying one or more information resources relating to the housing industry;
- performing keyword clustering on the identified information resources;
- determining one or more keyword clusters that appear in each of the information resources relating to the housing industry; and
- identifying the particular content item as related to the housing industry by identifying content items that were selected for display based on a keyword included in the one or more keyword clusters that appear in each of the information resources relating to the housing industry.

18. The computer-readable storage medium of claim 15, further comprising:
- identifying one or more information resources relating to the employment industry;
- performing keyword clustering on the identified information resources;
- determining one or more keyword clusters that appear in each of the information resources relating to the employment industry; and
- identifying the particular content item as related to the housing industry by identifying content items that were selected for display based on a keyword included in the one or more keyword clusters that appear in each of the information resources relating to the employment industry.

* * * * *